United States Patent
Nagaura et al.

(10) Patent No.: US 8,444,800 B2
(45) Date of Patent: May 21, 2013

(54) APPARATUS AND METHOD OF MANUFACTURING SILICON SEED ROD

(75) Inventors: Akimichi Nagaura, Yokkaichi (JP); Mamoru Nakano, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 339 days.

(21) Appl. No.: 12/913,088

(22) Filed: Oct. 27, 2010

(65) Prior Publication Data

US 2011/0220283 A1   Sep. 15, 2011

(30) Foreign Application Priority Data

Oct. 29, 2009  (JP) ................................. 2009-248687

(51) Int. Cl.
*B29C 65/02* (2006.01)
*H05B 6/02* (2006.01)
*H05B 6/10* (2006.01)
*C30B 33/06* (2006.01)

(52) U.S. Cl.
USPC ............ 156/272.4; 156/296; 156/304.2; 156/304.6; 219/633; 219/638

(58) Field of Classification Search
USPC ......... 156/272.4, 296, 304.2, 304.6; 219/603, 219/617, 633, 638
See application file for complete search history.

(56) References Cited

U.S. PATENT DOCUMENTS

2009/0158996 A1\* 6/2009 Chikusa et al. ............... 117/216
2012/0060562 A1\* 3/2012 Wochner et al. ................ 65/441

FOREIGN PATENT DOCUMENTS

JP           63-242339 A    10/1988

\* cited by examiner

*Primary Examiner* — Michael Tolin
(74) *Attorney, Agent, or Firm* — Edwards Wildman Palmer LLP

(57) ABSTRACT

A manufacturing apparatus of silicon seed rod in which two silicon seed rods are joined into one long silicon seed rod by welding, having: an upper seed rod holding part holding an upper silicon seed rod vertically; an elevating device holding a lower silicon seed rod which faces a lower end of the upper silicon seed rod in a state in which the lower silicon seed rod is movable vertically; an induction-heating coil being arranged around the lower end of the upper silicon seed rod; a preheating ring being disposed below the induction-heating coil; and a moving device of the preheating ring that moves the preheating ring between a heat position in which the preheating ring is induction-heated around an upper end of the lower silicon seed rod by the induction-heating coil and a wait position which is distant from the heat position.

5 Claims, 7 Drawing Sheets

APPARATUS AND METHOD OF MANUFACTURING SILICON SEED ROD

BACKGROUND OF THE INVENTION

1. Field of the Invention

The present invention relates to an apparatus and method of manufacturing silicon seed rod in which two silicon seeds are joined into one long silicon seed rod by welding.

Priority is claimed on Japanese Patent Application No. 2009-248687, filed Oct. 29, 2009, the content of which is incorporated herein by reference.

2. Description of Related Art

As a polycrystalline silicon producing method, a method of producing by the Siemens method has been known. According to this producing method by the Siemens method; a plurality of silicon seed rods are provided in a reactor and heated, raw material gas including chlorosilane gas and hydrogen gas is supplied to the reactor to bring the raw material gas into contact with the heated silicon seed rods, and polycrystalline silicon is deposited on the surfaces of the silicon seed rods by heat decomposition and hydrogen reduction of the raw material gas as columnar-shaped silicon rods. In this case, the silicon seed rods fixed upright on electrodes mounted on a bottom plate portion of the reactor. Every two silicon seed rods are paired and the upper end portions thereof are connected to each other by a short connecting rod so that they are formed in a Π-shape.

In the producing method of polycrystalline silicon by the Siemens method, the silicon seed rods are manufactured by hewing out from a silicon rod. Since the upper parts of the silicon rods which are connected by the connecting rods are cut off when separating in order to be taken out from the reactor, so that the silicon seed rods are shorter than the original silicon seed rods. Therefore, since the silicon seed rods are getting shorter every manufacturing and hewing out, it is necessary to manufacture silicon seed rods from long silicon seed rods periodically. The long silicon seed rod can be produced, for example, by joining short silicon seed rods as described in Japanese Unexamined Patent Application, First Publication No. S63-242339.

Japanese Unexamined Patent Application, First Publication No. S63-242339 describes below method. First, two silicon seed rods are inserted in a horizontal heating tube and are fixed in a state in which the rods are abutted. Next, the heating tube is arranged vertically; a preheating ring is heated into glowing state by a high-frequency heating coil disposed in the heating tube; and one of the silicon seed rods is preheated. After preheating the silicon seed rod, the high-frequency heating coil is moved to the abutted portion of the two silicon seed rods so as to heat the abutted portion, so that the abutted portion is melted by further raising the heating output. After that, by decreasing the output of the high-frequency heating coil by degrees so as to cool down the abutted portion of the silicon seed rods, the silicon seed rods are welded.

SUMMARY OF THE INVENTION

Problems to be Solved by the Invention

However, by the method described in Japanese Unexamined Patent Application, First Publication No. S63-242339, since the silicon seed rods are inserted horizontally in the heating tube, the ends thereof are bent down by the own weights, so that it is difficult to align the ends of the silicon seed rods. Further, after heating the silicon seed rods by the preheating ring, it is necessary to move the heating position of the silicon seed rods from the preheating position to the welding position of the silicon seed rods by moving the high-frequency heating coil. Since the transference of the heating position should be operated by the transference of the high-frequency heating coil, it is complicated to control the heated point, the impedance matching with respect to the variation of the heated point, and the like. Moreover, since the silicon seed rods are heated and melted in a state of being in contact with each other, the melting is not sufficient at the contact surface, so that the welding is defective. As a result, the welding defection parts will be excessively heated when producing polycrystalline silicon.

Means for Solving the Problem

The present invention is achieved in consideration of the above circumstances, and has an object of providing a manufacturing apparatus and method of silicon seed rod which can be easily controlled and manufacture high-quality silicon seed rods.

A manufacturing apparatus of silicon seed rod according to the present invention is an apparatus in which two silicon seed rods are joined into one silicon seed rod by welding, having: an upper seed rod holding part holding an upper silicon seed rod vertically on an upper wall of a chamber with penetrating the upper wall; an elevating device holding a lower silicon seed rod which faces a lower end of the upper silicon seed rod along a holding axis of the upper seed rod holding part in a state in which the lower silicon seed rod is movable vertically in the chamber; an induction-heating coil being arranged around the lower end of the upper silicon seed rod which is held by the upper seed rod holding part; a preheating ring being disposed below the induction-heating coil; and a moving device for the preheating ring that moves the preheating ring between a heat position in which the preheating ring is induction-heated around an upper end of the lower silicon seed rod by the induction-heating coil and a wait position which is distant from the heat position.

In the manufacturing apparatus of silicon seed rod, the lower end of the upper silicon seed rod and the upper end of the lower silicon seed rod are faced each other with a gap. First, the preheating ring around the upper end of the lower silicon seed rod is induction-heated by the induction heating coil. The temperature of the preheating-ring increases, and then the upper end of the lower silicon seed rod is heated by the heat of the preheating ring. When the upper end of the lower silicon seed rod glows, the preheating ring is moved to the wait position, and then the lower silicon seed rod is moved upward so as to be in contact with the lower end of the upper silicon seed rod, so that the heat of the lower silicon seed rod is transferred to the upper silicon seed rod. Thus the ends of the upper and lower silicon seed rods glow, and then the output of the induction-heating coil is increased so that the ends of the silicon seed rods are melted. The lower silicon seed rod and the upper silicon seed rod are in contact with each other at the ends thereof in molten state and adhered to each other. Then, the output of the induction-heating coil is decreased so that the adhered part is cooled.

As described above, since the silicon seed rods are arranged along the vertical direction in the chamber, the rods are not bent by own weights. Therefore, the silicon seed rods can be easily aligned. Furthermore, the preheating ring is positioned below the induction-heating coil which is fixed around the lower end position of the upper silicon seed rod, and the upper end of the lower silicon seed rod is heated by the preheating ring. After heating, the lower silicon seed rod is moved upward so as to transfer the heat to the upper silicon seed rod, and then they are melted and joined with each other by the induction-heating coil. That is, by moving the lower silicon seed rod vertically, it is not necessary to move the induction-heating coil, so that the welding part of the silicon seed rods can be heated efficiently.

In the manufacturing apparatus of silicon seed rod according to the present invention, it is preferable that a seed rod rotating device which rotates the lower silicon seed rod around the holding axis be provided.

After the glowing ends of the upper and lower silicon seed rods are melted by the induction-heating coil, the lower silicon seed rod is in contact with the upper silicon seed rod with rotating. Therefore, the molten parts of the silicon seed rods can be joined in a state in which they are uniformly blended with each other, so that the welding defect can be greatly reduced.

A manufacturing method of silicon seed rod joining two silicon seed rods into one long silicon seed rod by welding, having the steps of: disposing an upper silicon seed rod and a lower silicon seed rod vertically in a chamber so as to face a lower end of the upper silicon seed rod and an upper end of the lower silicon seed rod each other; arranging an induction-heating coil around the lower end of the upper silicon seed rod; heating the upper end of the lower silicon seed rod to glow by a preheating ring which is disposed below the induction-heating coil and is induction-heated; elevating the lower silicon seed rod so as to transfer heat from the glowing lower silicon seed rod to the lower end of the upper silicon seed rod so that the lower end of the upper silicon seed rod and the upper end of the lower silicon seed rod glow; melting the glowing lower end of the upper silicon seed rod and the glowing upper end of the lower silicon seed rod by induction-heat of the induction-heating coil in a state in which a gap is made between the lower end of the upper silicon seed rod and the upper end of the lower silicon seed rod; bringing the lower end of the upper silicon seed rod and the upper end of the lower silicon seed rod into contact with each other in molten state; and cooling the upper silicon seed rod and the lower silicon seed rod so that the upper silicon seed rod and the lower silicon seed rod are welded together.

By melting the silicon seed rods with the gap between the ends thereof, the molten parts of the ends can be formed spherically. Therefore, the ends are sufficiently melted, so that a welded part which has few defects such as holes can be obtained.

Furthermore, in the manufacturing method of silicon seed rod according to the present invention, it is preferable to further have the step of keeping the lower end of the upper silicon seed rod and the upper end of the lower silicon seed rod in contact with each other in molten state for a prescribed period before cooling.

Accordingly, convection flows are generated in molten parts of the two silicon seed rods, so that the molten parts are blended. Therefore, a uniform weld part can be obtained.

In the manufacturing method of silicon seed rod according to the present invention, it is preferable to further have the step of further elevating the lower silicon seed rod after keeping the upper silicon seed rod and the lower silicon seed rod in contact with each other for a prescribed period so as to press molten parts of the silicon seed rods with each other so that the molten parts radially swell out, and then cooling.

Since the molten parts swell out radially by pressing with each other, the ends of the two silicon seed rods are fixed steady. Furthermore, the thickness of the silicon seed rod after welding can be uniformed by operating a grinding process or the like of the swelled part if desired.

In the manufacturing method of silicon seed rod according to the present invention, it is preferable that, while keeping the lower end of the upper silicon seed rod and the upper end of the lower silicon seed rod in contact with each other in molten state for a prescribed period, the lower silicon seed rod be further rotated around an axis of the lower silicon seed rod In the manufacturing method of silicon seed rod according to the present invention, it is preferable that when transferring the heat from the lower silicon seed rod to the upper silicon seed rod, the lower end of the upper silicon seed rod and the upper end of the lower silicon seed rod be in contact with each other.

Effects of the Invention

According to the present invention, by fixing the induction-heating coil around the lower end part of the upper silicon seed rod and moving the preheating ring and the lower silicon seed rod, the ends of the silicon seed rods glows until they can be induction-heated. Therefore, it is easy to control the impedance matching with respect to the induction-heating coil and the like. Furthermore, since the lower silicon seed rod can be moved vertically, the ends of the silicon seed rods can be butted after the ends are absolutely melted, so that a high-quality silicon seed rod can be manufactured.

DETAILED DESCRIPTION OF THE INVENTION

Hereinafter, an embodiment of the manufacturing apparatus and method of silicon seed rod according to the present invention will be described with reference to the drawings.

Figure 1:
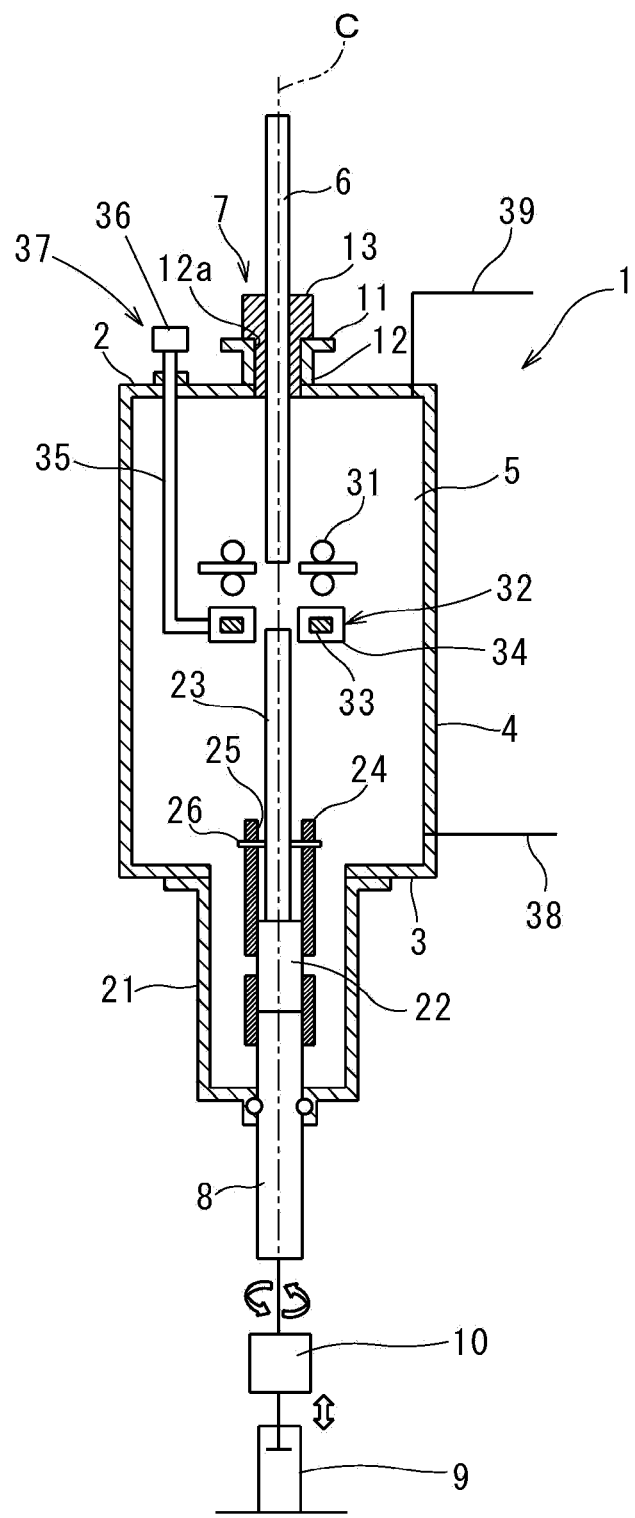
FIG. 1 is a longitudinal cross-sectional view showing an embodiment of a manufacturing apparatus of silicon seed rod according to the present invention.

The manufacturing apparatus 1 of silicon seed rod according to the present embodiment, as shown in FIG. 1, at an upper wall 2 of a chamber 5 which is surrounded by the upper wall 2, a lower wall 3, and a peripheral wall 4, an upper silicon seed rod holding part 7 holding a silicon seed rod (an upper silicon seed rod) 6 is provided with penetrating the upper wall 2 vertically. A main shaft 8 is held at the lower wall 3 of the chamber 5 with penetrating therethrough in a state in which the main shaft 8 can be moved vertically and rotated along a holding axis C of the upper silicon seed rod holding part 7. An elevating device 9 moving the main shaft 8 vertically and a rotating device 10 rotating the main shaft 8 around the holding axis C is provided at a lower end of the main shaft 8 which protrudes downward from the lower wall 3 of the chamber 5. The chamber 5 is provided with a door (not illustrated) opening the interior of the chamber 5.

Figure 2:
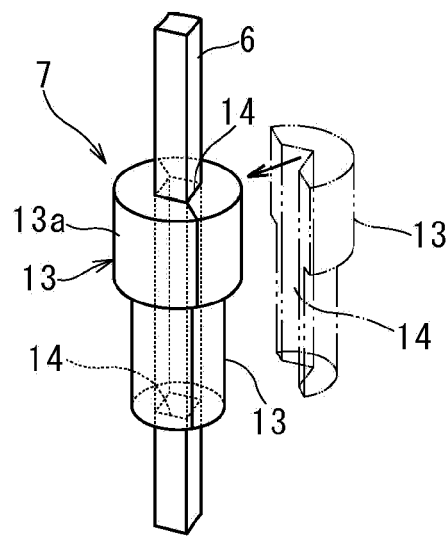
FIG. 2 is a perspective view showing an upper silicon seed rod holding part of FIG. 1.
Figure 4A:
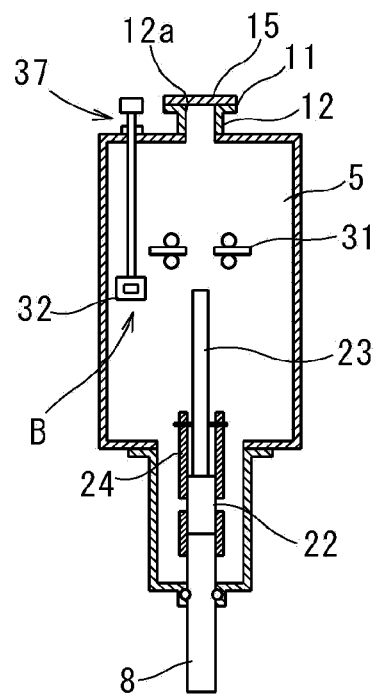
FIGS. 4A to 4C are longitudinal cross-sectional views sequentially showing a preheating step (i.e., a former step of welding the silicon seed rods) using the manufacturing apparatus of silicon seed rod of FIG. 1.

In this case, a cylindrical part 12 having an upper flange 11 is formed on the upper wall 2 of the chamber 5. The upper silicon seed rod holding part 7 is detachably provided in a hole 12a of the cylindrical part 12. As shown in FIG. 2, the upper silicon seed rod holding part 7 is constructed from a pair of cramp members 13 each having a half-cylindrical shape. The cramp members 13 hold and squeeze the silicon seed rod 6 at a middle portion along the longitudinal direction of the silicon seed rod 6. The cramp members 13 are made from, for example, polytetrafluoroethylene (PEFE). The cramp members 13 have holding grooves 14 for a silicon seed rod on separation surfaces thereof, and are air-tightly fitted into the hole 12a of the cylindrical part 12 so as to hold the silicon seed rod 6 which is adapted in the holding grooves 14 with cooperating with each other to cramp from both side of the silicon seed rod 6. Upper end parts 13a of the cramp members 13 are combined with each other and formed so as to have a larger diameter than that of the hole 12a, so that the cramp member 13 are adapted to the hole 12a and does not fallen down from the hole 12a. As shown in FIG. 4A, with respect to the cylindrical member 12 after the upper silicon seed rod holding part 7 is detached, a cap 15 is attached to the flange 11 so as to close the chamber 5.

A cylindrical case 21 which has a smaller diameter than that of the peripheral wall 4 is fixed to the lower wall 3 of the chamber 5. The cylindrical case 21 surrounds the upper end of the main shaft 8. On the upper end of the main shaft 8, a connecting shaft 22 which is made from quartz is fixed in series. A chuck 24 holding the lower end of a silicon seed rod (a lower silicon seed rod) 23 is provided to the connecting shaft 22. A hole 25 is formed on the chuck 24 so that the lower end of the silicon seed rod 23 is inserted therein. A plurality of setscrews 26 are provided so as to fix the silicon seed rod 23 which is inserted in the hole 25 by pressing the silicon seed rod 23 from the side. The main shaft 8 and the chuck 24 are made from, for example, molybdenum (Mo).

The upper silicon seed rod holding parts 7 provided at the upper wall 2 of the chamber 5 and the chuck 24 in the main shaft 8 of lower area hold each silicon seed rod. That is, the upper silicon seed rod 6 which is held by the upper silicon seed rod holding part 7 and the lower silicon seed rod 23 which is held by the chuck 24 of the main shaft 8 are arranged on the same axis C so as to face each other at the top ends thereof.

In the chamber 5, a high-frequency induction-heating coil (an induction-heating coil) 31 is statically provided at a position surrounding the lower end of the upper silicon seed rod 6 which is held by the upper silicon seed rod holding part 7. The high-frequency induction-heating coil 31 is formed as substantially a ring-plate shape, arranged concentrically with the holding axis C of the upper silicon seed rod holding part 7, and fixed to the peripheral wall 4 of the chamber 5 or the like via brackets (not illustrated).

Figure 3:
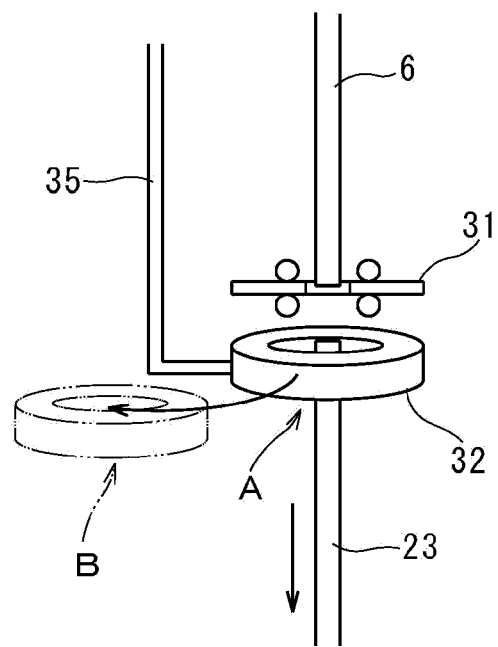
FIG. 3 is a schematic view showing a high-frequency induction-heating coil and a preheating ring of FIG. 1.

A preheating ring 32 is provided under the high-frequency induction-heating coil 31. The preheating ring 32 is formed by covering a carbon ring 33 with quartz 34, and is fixed horizontally from the top end of an L-shape holding shaft 35 which is hanged from the upper wall 2 of the chamber 5. The holding shaft 35 is provided pivotably on the upper wall 2 of the chamber 5, and has an operating part 36 at the upper end thereof protruding from the chamber 5. By operating and rotating the operating part 36, as shown in FIG. 3, the preheating ring 32 moves between a heat position A in which the preheating ring 32 surrounds the upper end of the lower silicon seed rod 23 slightly lower than the high-frequency induction-heating coil 31 and a wait position B in which horizontally apart from the heat position A. That is, in this embodiment, a moving device 37 of preheating ring 32 is constructed from the holding shaft 35 and the operating part 36 thereof.

The chamber 5 is connected to an exhaust system 38 which discharges content of the chamber 5 by vacuuming and an inert gas supply system 39 which supplies inert gas such as Argon gas to the chamber 5.

Next, the method manufacturing a silicon seed rod by joining two silicon seed rods 6 and 23 into one long silicon seed rod by the manufacturing apparatus 1 of silicon seed rod as constructed above will be described. The present manufacturing method broadly has a preheating step and a melting and welding step.

(Preheating Step)

First, as shown in FIG. 4A, the cap 15 is attached to the flange 11 of the cylindrical part 12 of the chamber 5. The lower silicon seed rod 23 is held vertically upward by the chuck 24 of the main shaft 8. The lower silicon seed rod 23 has a length of, for example, 750 mm. In a state above-described, the chamber 5 is vacuumed, and then supplied Argon gas therein, so that the chamber 5 is maintained as an argon gas atmosphere. The inner pressure of the chamber 5 is maintained positive to the outer so as not to enter air therein.

Figure 4B:
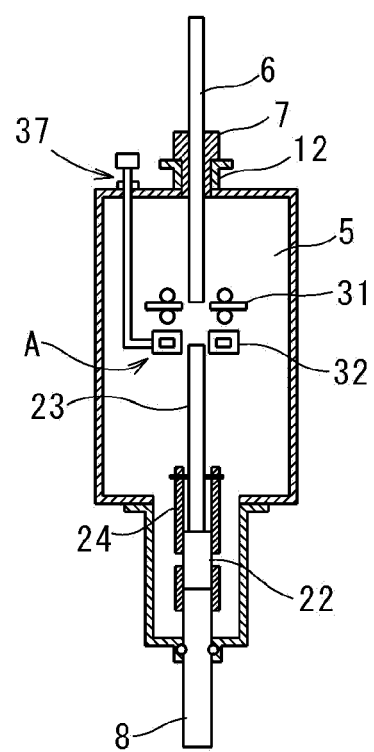

Next, the cap 15 is removed, and then the upper silicon seed rod holding part 7 holding the upper silicon seed rod 6 is inserted into the hole 12a of the cylindrical part 12 while argon gas is blown into the chamber 5 so as not to enter the air into the chamber 5. Thereby, as shown in FIG. 4B, inserting the lower end of the upper silicon seed rod 6 into the chamber 5, and closing the hole 12a of the cylindrical part 12 by the upper silicon seed rod holding part 7. The upper silicon seed rod 6 is held at the mid part of the longitudinal direction by the upper silicon seed rod holding part 7, and faces at the lowest part toward the inside of the high-frequency induction-heating coil 31 in the chamber 5. The upper silicon seed rod 6 has a length of, for example, 1750 mm.

The preheating ring 32 is positioned at the heat position A which is immediately below the high-frequency induction-heating coil 31. The upper end of the lower silicon seed rod 23 faces toward the inside of the preheating ring 32. In this state, the upper silicon seed rod 6 is held in a state in which the lower end of the upper silicon seed rod 6 is spaced from the upper end of the lower silicon seed rod 23.

Figure 4C:
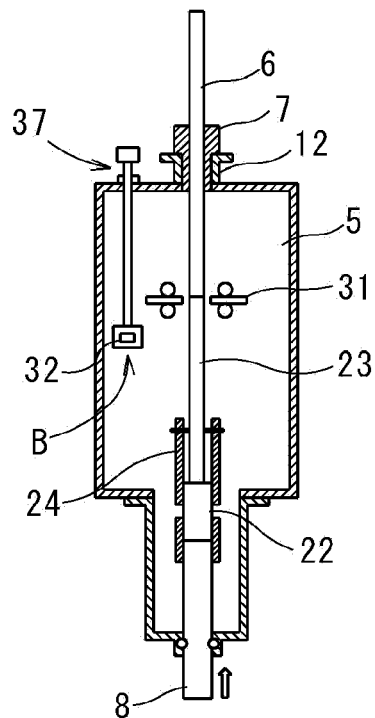

Then, by activating the high-frequency induction-heating coil 31, the preheating ring 32 at immediately below the coil 31 is induction-heated, so that the upper end part of the lower silicon seed rod 23 is heated by the heat of the preheating ring 32. After the upper end part of the lower silicon seed rod 23 is heated enough to glow, as shown by the arrow in FIG. 3, the lower silicon seed rod 23 is moved downward by the elevating device 9, and then the preheating ring 32 is moved from the heat position A to the wait position B. Next, as shown in FIG. 4C, the lower silicon seed rod 23 is moved upward again by the elevating device 9, so that the upper end of the lower silicon seed rod 23 is in contact with the lower end of the upper silicon seed rod 6. Therefore, the heat of the lower silicon seed rod 23 is transferred to the lower end of the upper silicon seed rod 6, so that the lower end of the upper silicon seed rod 6 is heated.

(Melting and Welding Step)

Figure 5A:
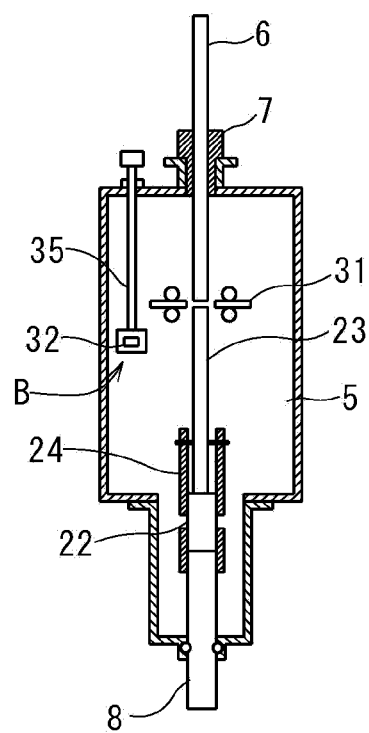
FIGS. 5A to 5C are longitudinally cross-sectional views sequentially showing a melting and welding step (i.e., a latter step of welding the silicon seed rod) using the manufacturing apparatus of silicon seed rod of FIG. 1.

Thus, the heat is transferred between the upper silicon seed rod 6 and the lower silicon seed rod 23 until the opposed ends are heated to glow, the lower silicon seed rod 23 is slightly moved downward, so that the ends of the silicon seed rods 6 and 23 have gaps as shown in FIG. 5A. In this state, by increasing the output of the high-frequency induction-heating coil 31, the ends of the silicon seed rods 6 and 23 are induction-heated. In this state, the silicon seed rods 6 and 23 are conducted since glowing, so that eddy currents are generated. As a result, the silicon seed rods 6 and 23 are self-heated by the Joule heat of the eddy currents.

Figure 5B:
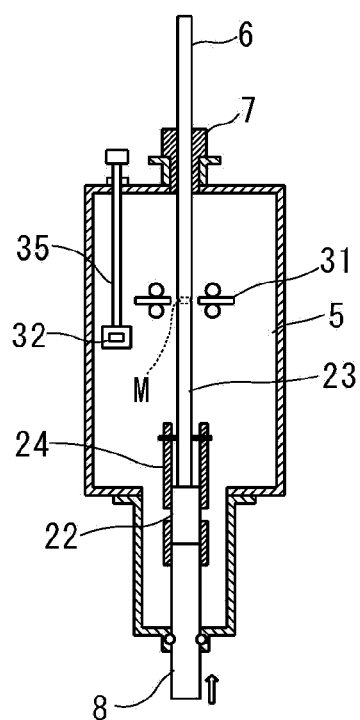
Figure 5C:
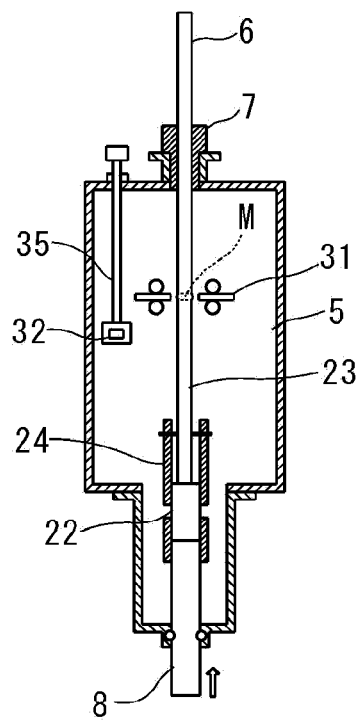
Figure 6A:
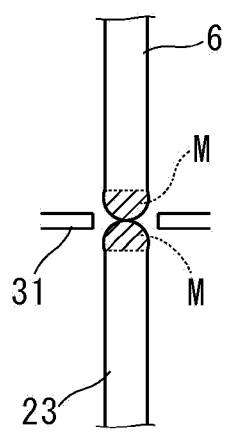
FIGS. 6A to 6C are front views sequentially showing a welded part of the silicon seed rod in the melting and welding step of FIGS. 5A to 5C.
Figure 6B:
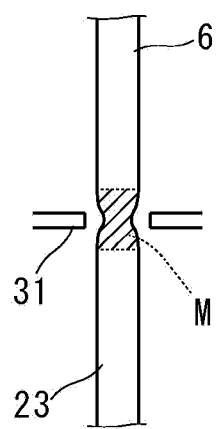
Figure 6C:
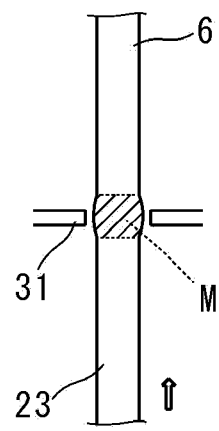
Figure 7:
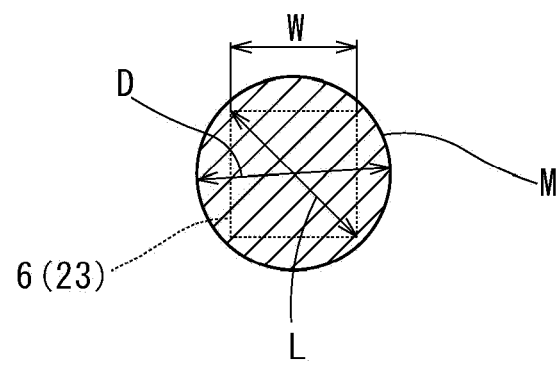
FIG. 7 is a transverse cross-sectional view showing the melted parts of the silicon seed rods.

Then, as shown in FIG. 6A, if the ends of the silicon seed rods 6 and 23 are melted, molten parts M are conglobated since there is a gap between the ends of the silicon seed rods 6 and 23. Note, the molten parts M are illustrated by hatchings. After the spherical molten parts M are formed, as shown in FIG. 5B, the lower silicon seed rod 23 is in contact with the upper silicon seed rod 6. At this time, by rotating the lower silicon seed rod 23 as necessary, the silicon seed rods 6 and 23 are aligned around the axis so that the side surfaces are in a same plane each other. Then, by keeping the molten parts M of the silicon seed rods 6 and 23 in contact with each other for 5 to 15 minutes, the molten parts M of the silicon seed rods 6 and 23 are welded (refer to FIG. 6B). When keeping the contact state, the lower silicon seed rod 23 may be rotated. Then, as shown in FIG. 5C, by pressing the molten parts M from below by moving the lower silicon seed rod 23 upward, the molten parts M radially slightly swells as shown in FIG. 6C. Then, the output of the high-frequency induction-heating coil 31 is decreased so as to cool the molten parts M. FIG. 7 shows the schematic sectional view of the molten parts M which are pressed with each other by moving the lower silicon seed rod 23 upward. With respect to the silicon seed rods 6 and 23 having rectangular cross sections, a width W of the side thereof is 7 to 10 mm. The molten part M is formed so as to have a larger diameter D than a diagonal length L of the silicon seed rods 6 and 23.

When the molten parts M are cooled enough, the door of the chamber 5 is open so that the silicon seed rods 6 and 23 are taken out. The swelled outer circumference portions of the welded part of the silicon seed rods 6 and 23 are grinded by a grinder or the like so as to have an even side surface, so that one long silicon seed rod is obtained. Since the molten parts M which is larger than the diagonal length L of the silicon seed rods 6 and 23 is grinded, the side surface of the silicon seed rod is evened after grinding, so it is possible to manufacture the silicon seed rod having an even thickness without a neck.

The silicon seed rod which is manufactured as above-described has a length of, for example, 2500 mm (i.e., 1750 mm+750 mm).

That is, in the manufacturing apparatus 1 of silicon seed rod, by fixing the high-frequency induction-heating coil 31 in the chamber 5 so as not to be displaced, and by moving the preheating ring 32 and the lower silicon seed rod 23, it is possible to heat the silicon seed rods 6 and 23 until glowing so that the silicon seed rods 6 and 23 can be induction-heated by the high-frequency induction-heating coil 31. The output of the high-frequency induction-heating coil 31 is just varied between heating the preheating ring 32 and heating the glowing silicon seed rods 6 and 23. As a result, the complicated controls such as an impedance matching or the like can be easily operated.

According to the method described in Japanese Unexamined Patent Application, Publication No. S63-242339, the silicon seed rods are heated at the other parts than the weld parts in order to transfer the heat to the weld part. Therefore, the silicon seed rods are broadly heated and strained at the heated parts after cooled. As a result, cracks or breaking are easy to be incident on the silicon seed rod when handling. On the other, according to the method of the present embodiment, the silicon seed rods 6 and 23 are melted only at the end portions, and are not heated the other parts than the molten parts. Therefore, the silicon seed rods are scarcely damaged.

Furthermore, when heating the ends of the silicon seed rods 6 and 23, as shown in FIG. 5A, the ends of the silicon seed rods 6 and 23 are melted in a state in which there is a gap between the ends, and then welded. Therefore, the ends of the silicon seed rods 6 and 23 are melted enough. Moreover, by keeping the molten parts M in a state of being contact with each other for a prescribed time, convection flows are generated in the molten parts M so that the molten parts M are homogeneously integrated. Therefore, welding defects such as holes are considerably reduced, so that high-quality silicon seed rods can be manufactured.

In addition, in the manufacturing apparatus 1 of silicon seed rod, since the lower silicon seed rod 23 is entirely contained in the chamber 5, the lower silicon seed rod 23 is restricted to a length of being containable in the chamber 5. However, the upper silicon seed rod 6 is held at the middle portion thereof along the longitudinal direction by the upper silicon seed rod holding part 7. Therefore, the upper silicon seed rod 6 is not restricted to a length, so that a silicon seed rod having a desired length can be manufactured. Whereas, in the manufacturing apparatus 1 of silicon seed rod, it is necessary only that a part of the upper silicon seed rod 6 along the longitudinal direction is stored in the chamber 5 with the lower silicon seed rod 23. Therefore, the apparatus can be restrained in size.

(Test Samples)

Welding tests using silicon seed rods having 8.5 mm square sections were performed. The inner content of the chamber was set as argon gas atmosphere. The high-frequency induction-heating coil heated the preheating ring by high-frequency around 2.3 MHz and power voltage of 7.5 kV. The upper end of the lower silicon seed rod was arranged at the heat position by the preheating ring and preheated. Next, after the preheating ring was left, the upper end of the lower silicon seed rod was in contact with the lower end of the upper silicon seed rod, so that the heat was transferred to the upper silicon seed rod. Then, the lower silicon seed rod was moved downward so that the ends of the silicon seed rods were slightly separated, the high-frequency induction-heating coil heated and melted the ends of the silicon seed rods. Subsequently, the lower silicon seed rod was moved upward again so that the ends were in contact with each other, and then the ends were welded.

The convection time in Table 1 is a time while the melt is convecting by temperature difference in the molten part. In the present test samples, the convection time indicates a time of keeping the contacting state after the lower end of the upper silicon seed rod and the upper end of the lower silicon seed rod are in contact with each other in molten state. The rotating time indicates a time in which the lower silicon seed is rotated while the molten parts of the silicon seed rods are in contact with each other. The rate of revolution was 12.5 rpm when rotating the lower silicon seed rod. With respect to a cooling step after welding, rapidly-cooled test samples and slowly-cooled test samples were manufactured. The rapid-cooled test samples were rapidly-cooled by reducing the output of the high-frequency induction-heating coil at a rate of −13 kV/sec; and the slowly-cooled test samples were slowly-cooled by reducing the output at a rate of −1 kV/sec.

The silicon seed rods of the test sample Nos. 1 to 8 in Table 1 were observed by X-ray transmission whether holes were generated or not at the weld parts. The sample in which the holes were not observed, and the sample in which five or less holes having a diameter of equal to or smaller than 0.3 mm were observed were considered "OK". The sample in which at least one hole having a diameter of larger than 0.3 mm was observed, and the sample in which more than five holes were observed even though the diameter of the hole was equal to or smaller than 0.3 mm were considered "NG". However, as shown in Table 1, there were no "NG" samples.

Furthermore, three-point bending tests with respect to the weld part were operated, so that maximum loads and bending stresses to breaking were obtained. In Table 1, the test samples Nos. 9 to 11 are test results of unwelded silicon seed rods as comparative objects.

TABLE 1

| No. | convection time (minute) | rotating time (minute) | rate of rotation (rpm) | cooling method | holes | maximum load (N) | bending stress (N/mm$^2$) |
|---|---|---|---|---|---|---|---|
| 1 | 0 | 0 | 0 | rapid | OK | 199 | 91 |
| 2 | 0 | 0 | 0 | rapid | OK | 179 | 95 |
| 3 | 10 | 0 | 0 | slow | OK | 161 | 78 |
| 4 | 10 | 0 | 0 | slow | OK | 157 | 76 |
| 5 | 10 | 0 | 0 | slow | OK | 178 | 84 |
| 6 | 10 | 10 | 12.5 | slow | OK | 160 | 98 |
| 7 | 10 | 10 | 12.5 | slow | OK | 211 | 89 |
| 8 | 10 | 10 | 12.5 | slow | OK | 204 | 99 |
| 9 | — | — | — | — | — | 294 | 135 |
| 10 | — | — | — | — | — | 255 | 117 |
| 11 | — | — | — | — | — | 291 | 114 |

As shown in Table 1, the strengths of the welded silicon seed rods were slightly smaller than that of the unwelded rods. However, the welded rods had practical strengths. Also, with respect to the holes, no holes were observed at the test samples Nos. 1 and 3 to 8. In the test sample No. 2, although a few holes were observed, the holes had diameters of equal to or smaller than 0.3 mm, and the number of holes was five or less, so that the effect to the strength was small. Every rod was broken at position slightly separated from the welded interface.

Therefore, although a few holes exist, it was confirmed that the silicon seed rod having a practical strength can be obtained. That is, since the ends of the silicon seed rods are melted enough and then joined, a hole is very small if generated, and thus the condition of the silicon seed rod seems to be lightly affected. Furthermore, the silicon seed rods, in which the lower silicon seed rod was rotated when the molten parts of the silicon seed rods are in contact with each other, had higher strength than the rods in which the lower silicon was not rotated. It is considered that the ends of the silicon seed rods were uniformly melted by rotating, so that the welding strength was improved.

As described above, by using the manufacturing apparatus of the present invention, high-quality silicon seed rod can be manufactured.

The present invention is not limited to the above-described embodiments and various modifications may be made without departing from the scope of the present invention.

For example, the preheating ring is moved along the horizontal direction in the illustrated embodiment. However, it is necessary just for the preheating ring to be separated from the induction-heating area by the high-frequency induction-heating coil after heating the upper end of the lower silicon seed rod. Therefore, for example, the preheating ring may be moved downward from the heat position.

In the above embodiment, after heating the upper end of the lower silicon seed rod until glowing, and then the upper end is in contact with the lower end of the upper silicon seed rod so as to transfer the heat. However, it is not necessary that the ends are in contact with each other. The heat may be transferred by arranging the ends with a small gap so as to face each other.

What is claimed is:

1. A manufacturing method of silicon seed rod joining two silicon seed rods into one long silicon seed rod by welding, comprising the steps of:

disposing an upper silicon seed rod and a lower silicon seed rod vertically in a chamber so as to face a lower end of the upper silicon seed rod and an upper end of the lower silicon seed rod each other;

arranging an induction-heating coil around the lower end of the upper silicon seed rod;

heating the upper end of the lower silicon seed rod to glow by a preheating ring which is disposed below the induction-heating coil and is induction-heated;

elevating the lower silicon seed rod so as to transfer heat from the glowing lower silicon seed rod to the lower end of the upper silicon seed rod so that the lower end of the upper silicon seed rod and the upper end of the lower silicon seed rod glow;

melting the glowing lower end of the upper silicon seed rod and the glowing upper end of the lower silicon seed rod by induction-heat of the induction-heating coil in a state in which a gap is made between the lower end of the upper silicon seed rod and the upper end of the lower silicon seed rod;

bringing the lower end of the upper silicon seed rod and the upper end of the lower silicon seed rod into contact with each other in molten state; and cooling the upper silicon seed rod and the lower silicon seed rod so that the upper silicon seed rod and the lower silicon seed rod are welded together.

2. The manufacturing method of silicon seed rod according to claim 1, further comprising the step of keeping the lower end of the upper silicon seed rod and the upper end of the lower silicon seed rod in contact with each other in molten state for a prescribed period before cooling.

3. The manufacturing method of silicon seed rod according to claim 2, further comprising the step of further elevating the lower silicon seed rod after keeping the upper silicon seed rod and the lower silicon seed rod in contact with each other for a prescribed period so as to press molten parts of the silicon seed rods with each other so that the molten parts radially swell out and cooling.

4. The manufacturing method of silicon seed rod according to claim 2, wherein while keeping the lower end of the upper silicon seed rod and the upper end of the lower silicon seed rod in contact with each other in molten state for a prescribed period, the lower silicon seed rod is further rotated around an axis of the lower silicon seed rod.

5. The manufacturing method of silicon seed rod according to claim 1, wherein when transferring the heat from the lower silicon seed rod to the upper silicon seed rod, the lower end of the upper silicon seed rod and the upper end of the lower silicon seed rod are in contact with each other.

\* \* \* \* \*